United States Patent [19]

Constantino

[11] 4,326,698

[45] Apr. 27, 1982

[54] GATE VALVE

[75] Inventor: Daniel G. Constantino, Mexico City, Mexico

[73] Assignee: Fip, S.A. de C.V., Mexico City, Mexico

[21] Appl. No.: 67,817

[22] Filed: Aug. 20, 1979

[51] Int. Cl.³ .................... F16K 27/04; F16K 27/10
[52] U.S. Cl. .................................. 251/327; 251/329
[58] Field of Search .............................. 251/329, 327

[56] References Cited

U.S. PATENT DOCUMENTS

| | | | |
|---|---|---|---|
| 2,904,306 | 9/1959 | Bryant | 251/329 X |
| 3,013,770 | 12/1961 | Anderson et al. | 251/329 |
| 3,172,638 | 3/1965 | Grove | 251/329 |
| 3,481,580 | 12/1969 | Grove et al. | 251/329 X |
| 3,921,957 | 11/1975 | Freeman | 251/327 |

FOREIGN PATENT DOCUMENTS 1309872  10/1962  France .............................. 251/327

*Primary Examiner*—Arnold Rosenthal
*Attorney, Agent, or Firm*—Vaden, Eickenroht, Thompson, Bednar & Jamison

[57] ABSTRACT

There is disclosed a gate valve having a fabricated, box-like body in which the gate is movable, and hubs welded to and extending within opposite walls of the body to mount seats on their inner ends to engage the gate. Laterally disposed, generally "C"-shaped, rigid reinforcing flanges have inner edges which are spaced from but extend closely about the opposite side walls and adjacent ends of the front walls of the body on opposite sides of the valve body. One end edge of each flange is welded to one hub and the other end edge thereof is welded to the other hub, whereby the flange functions as an eccentrically loaded tension member. A conduit connects to and extends outwardly from the outer end of each hub to enable the valve to be connected in a line, and each such conduit is thinner than the hub to which it is connected.

6 Claims, 6 Drawing Figures

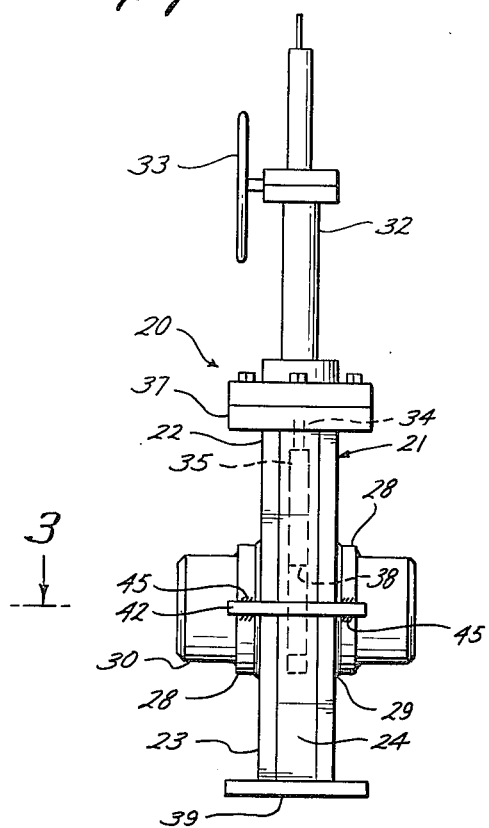
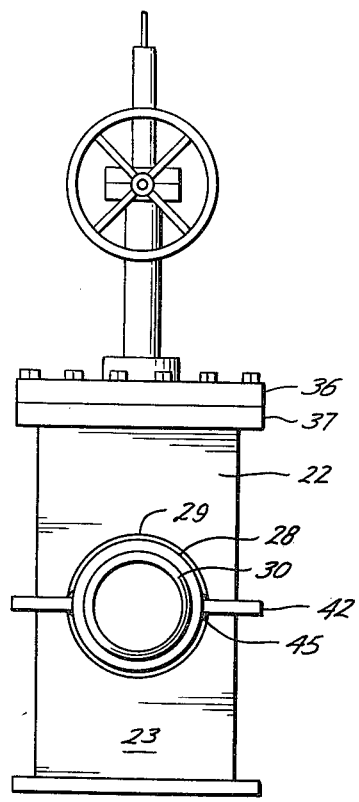
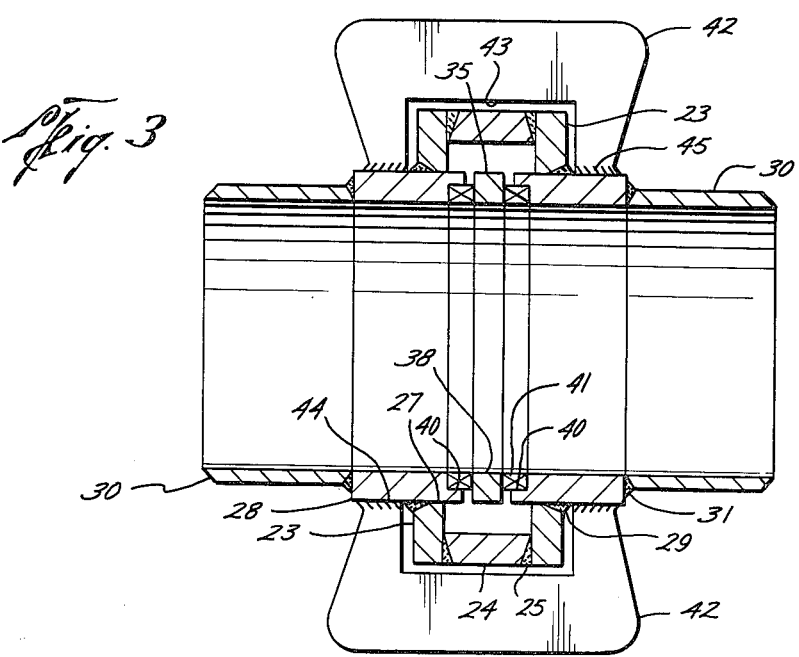

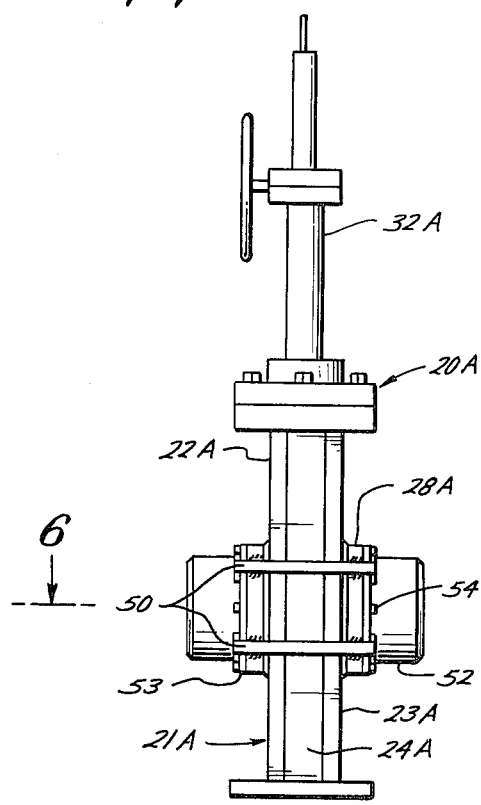
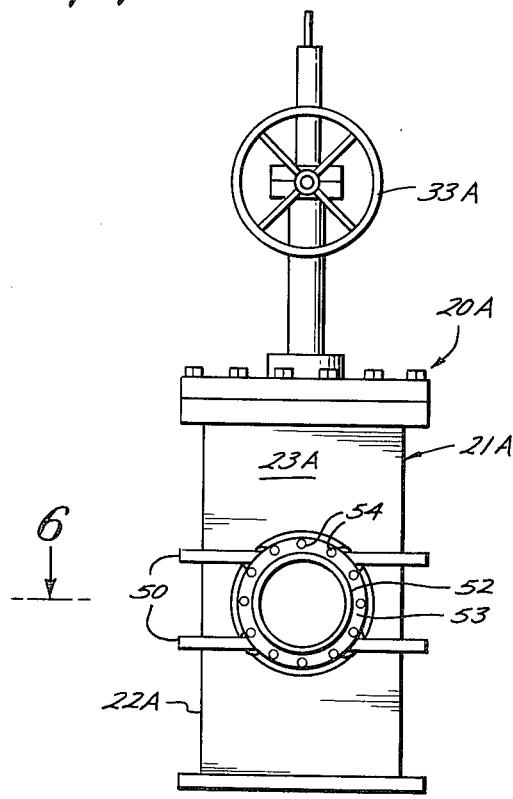
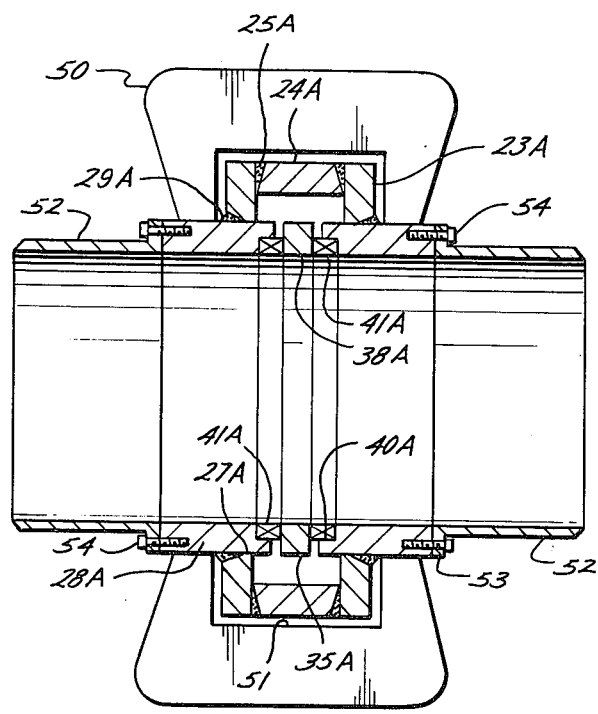

GATE VALVE

This invention relates generally to gate valves of the type having fabricated, box-like bodies made up of welded plates which form pressure vessels in which the gate is movable, and hubs welded to and extending within openings in the opposite walls of the body to mount seats on their inner ends in position to engage opposite sides of the gate. More particularly, this invention relates to improvements in gate valves of this type in which members extend between and are connected to the hubs on opposite sides of the valve body in order to reinforce the body against stresses due to pressure loads and external loads applied thereto, whereby the body may be fabricated from thinner plates than might otherwise be required.

In the valve of U.S. Pat. No. 2,904,306, rigid tie straps are welded to the hubs by means of pads at each end, and the pads include gusset plates intended to prevent bending of the straps. U.S. Pat. No. De. 194,297 shows a valve in which the ends of laterally disposed generally "C"-shaped flanges which extend about opposite sides of the valve body are welded to the hubs. However, the flanges comprise pin-connected parts, so that, like the tie straps of the valve of U.S. Pat. No. 2,904,306, they are incapable of carrying bending loads.

The generally "C"-shaped, reinforcing flanges of U.S. Pat. No. 3,632,084 are of rigid construction intermediate the welded connections of their ends to the hubs of a fabricated gate valve of this type. Consequently, these flanges function as eccentrically loaded tension members having the ability to carry bending as well as tension loads. However, the hubs of this valve, in addition to having pockets on their inner ends to carry the seats, have flanges on their outer ends to enable the valve to be connected in the line. Since the inner ends of the hubs must be thick enough to provide the seat carrying pockets, and also to carry the loads transmitted to the hubs by the reinforcing members, their outer ends are thicker than required to transmit external loads between the line and the valve body. Consequently, a large portion of these hubs represents wasted metal.

One embodiment of the valve of U.S. Pat. No. 3,013,770 shows generally "C"-shaped, rigid flanges whose ends are welded to relatively short hubs, whose outer ends are in turn welded to relatively thin-walled conduits. However, the reinforcing flanges are disposed within the box-like valve body, which requires that opposite walls of the body be discontinued to receive the flanges. This, of course, increases the stress which must be carried by the remainder of the valve body, and in general complicates the fabrication of the body.

An object of this invention is to provide a gate valve of this type which overcomes the above-described problems.

Another object is to provide, in a valve of this type having reinforcing flanges which function as eccentrically loaded tension members, hubs which require no more metal than that necessary to carry the seats and to connect with the reinforcing flanges, and which are so arranged with respect to the remainder of the valve body as not to detract from its load carrying capacity or complicate its fabrication.

A further object is to provide such a valve whose hubs are of such construction as to permit the valve to be connected in a line in a variety of different ways.

Still another object is to provide such a valve which is relatively simple and inexpensive to fabricate.

These and other objects are accomplished, in accordance with the illustrated embodiment of the invention, by a gate valve of the type described having laterally disposed, generally "C"-shaped, rigid reinforcing flanges whose inner side edges are spaced from but extend closely about the opposite side walls and adjacent ends of the front walls of the fabricated body of the valve. More particularly, one end edge of each flange is welded to one hub and the other end edge thereof is welded to the other hub so that each flange functions as an eccentrically loaded tension member. As previously described, by permitting the flange to bend in this manner, it is possible to substantially increase the stress which may be carried thereby due to external loads on the valve body.

Each hub is of such thickness as to provide a pocket in its inner end to carry a seat, and is of a length not substantially greater than that required to permit one end of the "C"-shaped flange to be connected thereto. More particularly, a conduit is connected to and extends outwardly from the outer end of each hub to provide a means by which the valve may be connected in a line, the conduit being thinner than the hub to which it is connected, and in particular of a thickness which need not be greater than that required to withstand the pressure in the line in which the valve is connected. In this manner, considerable metal can be saved, as compared, for example, with the previously described valve wherein the thick hub is of substantial length and has a flange at its outer end for connection in the line.

The other end of the hub is adaptable for connection to the conduit in any number of ways. Thus, as illustrated in one embodiment of the invention, the outer end of the hub and inner end of the conduit are welded to one another. In another illustrated embodiment of the invention, the outer ends of the hubs have threaded holes which receive studs connecting the conduits to the hubs.

One or more pairs of flanges may be provided on opposite sides of the valve body. Thus, in one embodiment of the invention, a single pair of flanges are shown as being disposed within a plane passing through the axis of the flowway. In the other illustrated embodiment of the invention, however, a pair of flanges are shown on each side of the body, preferably on opposite sides of a plane passing through the axis of the flowway of the valve body.

In the drawings, wherein like reference characters are used throughout to designate like parts:

FIG. 1 is a side elevational view of a valve constructed in accordance with the first-described embodiment of the present invention;

FIG. 2 is a front elevational view of the valve of FIG. 1;

FIG. 3 is an enlarged longitudinal sectional view of the valve of FIGS. 1 and 2, as seen along broken lines 3—3 of FIG. 1;

FIG. 4 is a side elevational view of a valve constructed in accordance with the second-described embodiment of the invention;

FIG. 5 is a front elevational view of the valve of FIG. 4; and

FIG. 6 is an enlarged longitudinal sectional view of the valve of FIGS. 4 and 5, as seen along broken lines 6—6 of FIG. 4.

With reference now to the details of the above-described drawings, the valve embodiment shown in FIGS. 1 and 2, and indicated in its entirety by reference character 20, comprises a body 21 which includes an elongated, generally rectangular section 22 having relatively long or wide front walls 23 welded to relatively short or narrow side walls 24. More particularly, the front walls extend the full width of the rectangular section, and the opposite ends of the short side walls are welded to the inner surfaces thereof at 25, as shown in FIG. 3, to form the four corners of the section. It will be understood, of course, that this particular rectangular body section construction is merely exemplary, and that the body may be made of plates of other shapes and sizes welded together in a different manner.

As shown in FIG. 3, axially aligned openings 27 are formed in the front walls of the body generally intermediate the upper and lower ends of the rectangular body section 22. The body 21 also includes hubs 28 which extend within the openings and are welded at 29 to the front walls, and conduits 30 which are welded at 31 to the outer ends of the hubs in axial alignment therewith. For reasons previously mentioned, and to be discussed in detail to follow, these conduits are considerably thinner than the hubs.

A bonnet assembly 32, which is mounted on the upper end of the rectangular section of the valve body, includes a handwheel 33 geared to a stem 34 on the upper end of a gate 35 for cooperation therewith in moving the gate longitudinally within the valve body between opened and closed positions. Thus, the stem extends through a flange 36 on the lower end of the bonnet assembly, and a top plate or flange 37 of the valve body to which the bonnet flange is connected.

In this illustrated embodiment of the invention, gate 35 has a conduit 28 therethrough which is adapted to be moved into and out of alignment with the flowway through aligned hubs 28. With the gate raised, as in FIG. 1, its conduit 38 is aligned with these openings so as to open the valve (see FIG. 3). However, since the rectangular extension of the valve body extends both above and below the hubs, the gate is free to be moved downwardly to a closed position upon manipulation of the operator of the bonnet assembly. The lower end of the rectangular body section is closed by means of a bottom flange 39 welded or otherwise secured about all four walls thereof. Preferably, the flange extends outwardly from the side and front walls to provide a convenient support for the valve body.

As shown in FIG. 3, the inner end of each hub 28 is provided with an annular pocket 40, and a seat 41 is received in each such pocket for engaging at its inner end with the adjacent side of gate 35. This seat, which is diagrammatically illustrated in FIG. 3, may be of any conventional type to form a seal between the hub in which it's carried and the gate. Its inner diameter is, of course, in alignment with the inner diameter of the hub in which it's carried, as well as the conduit connected to the hub, so that there is a full opening through the valve 20 when the gate is open.

A "C"-shaped flange 42 is mounted on each side of the valve body for extension generally horizontally, or laterally of the valve body. More particularly, both flanges 42 are disposed on substantially the same level and lie generally within a horizontal plane passing through the axis of the flowway through the valve. As previously described, the inner edge 43 of each such flange extends closely about but is spaced from side wall 24 and the adjacent ends of front walls 23 of the pressure-contained section 22 of the valve body. The ends 44 of the flange 42 are welded at 45 to the hubs near the connection of the hubs to the rectangular section 22 of the valve body. As shown in the drawings, weldments 45 are made along the upper and lower sides of the end edges of the flanges.

As previously discussed, flanges 42 function as eccentrically loaded tension members in that they provide tension carrying beams which are laterally offset from the centerline of loading—i.e., from the connection of their ends to the hubs. Since each flange is free to bend under the stress applied thereto by either pressure or external loading on the valve, and thus able to carry bending as well as tension loads, it has considerably greater stress capacity than a similar flange which is not free to bend.

As will be apparent from FIG. 3, each hub 28 must be thick enough to provide the pockets 40 in which seats 41 are carried, and to provide a means to which the external loads carried by the flanges 42 may be transmitted from one flange to the other. However, it need be no longer than required to provide a means of connection to the ends of the flange 42. Conduits 30, on the other hand, are only thick enough to provide a means for connecting the valve in a line, and thus are substantially thinner than the hubs to which they are connected.

As previously described, in this embodiment of the invention, conduit 30 is connected to its adjacent hub 28 by a weld 32. As will be understood from the description of the second embodiment of the invention to follow, other means of attachment may be provided between the outer end of the hub and conduit. As shown, the outer end of each conduit 30 is prepared, like its inner end, with a chamferred surface to facilitate its welding to the end of the line to which it's to be connected. Obviously, the outer end of the conduit may be otherwise prepared for connection to the line.

The valve embodiment shown in FIGS. 4 and 5, and indicated in its entirety by reference character 20A, is identical in many respects to the valve 20 previously described. Consequently, the parts of the embodiment of FIGS. 4 to 6 which are identical to parts of the valve of FIGS. 1 to 3 bear identical reference characters with the addition of the suffix "A". Thus, in general, like valve 20, valve 20A includes a valve body 21A having a rectangularly shaped section 22A made up of long front walls 23A and short side walls 24A connected by corner welds 25A.

Valve 20A is also similar to valve 20 in that it includes hubs 28A extending within openings 27A in the front walls of the valve body, and welded at 29A to the valve body about the outer ends of the openings, as shown in FIG. 6. Still further, a gate 35A is movable longitudinally within the rectangular section of the valve body between the open position of FIG. 3, in which port 38A therein is aligned with the openings through the hubs and conduits, and a closed position (not shown). The gate is so moved by means of an operator 33A mounted on a bonnet assembly 32A supported on the upper end of the rectangular section of the valve body. Still further, seats 41A are carried within pockets 40A on the inner ends of the hubs 28A for engaging the opposite sides of the gate and sealing between the gate and hub in which it's carried.

Valve 20A differs from valve 20 in that a pair of reinforcing members 50 connect its hubs 28A on each side of the valve body. As in the case of valve 20, each of these reinforcing members 50 is "C"-shaped flange whose inner edge 51 extends closely about but is spaced from the side wall 24A and the adjacent ends of the front walls 23A of the rectangular section of the valve body. Also, flanges 50 extend laterally with respect to the valve body, and one flange of each pair lies in generally the same plane as a flange of the pair on the opposite side of the valve body. As compared with the single pair of flanges 42, however, the two pairs of flanges 50 are longitudinally or vertically spaced apart and disposed on opposite sides of a plane passing through the centerline of the flowway of the valve.

The inner end edges of the flanges 50 are welded to the hubs of the valve body in the same manner as are the flanges 42 to the hubs of valve 20. Thus, each flange 50 performs the same function in reinforcing the valve body against external loads as does each flange 42. As will also be understood, the numbers and arrangements of the flanges shown in the two embodiments of this invention are merely illustrative of a great variety of numbers and arrangements which may be employed within the scope of the present invention.

As previously mentioned, valve 20A also differs from valve 20 in the means by which conduits are connected to the outer ends of the hubs in order to provide a means for connecting the valve in a line. These conduits, which are indicated by reference character 52 in FIGS. 4 to 6, are similar to conduits 30 of valve 20 in that they are considerably thinner than the seat carrying hubs. However, rather than being welded to the outer ends of the hubs, conduits 52 have outturned flanges 53 which receive studs 54 threadedly received in holes in the adjacent end faces of hubs 28A. Despite these differences, however, it will be understood that the conduits 52 are of such construction and arrangement, relative to the hubs 28A, that valve 20A possesses the same advantages previously noted with respect to valve 20.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A gate valve, comprising a fabricated, boxlike body having front and side walls and openings formed in the front walls, and hubs extending within the openings and welded to the front walls to provide a flowway through the body, the inner ends of the hubs having annular pockets in which seats are received to provide a continuation of the flowway, a gate longitudinally movable within the body between positions opening and closing the flowway through the seats, laterally disposed, generally "C"-shaped, rigid reinforcing flanges having inner side edges which are spaced from but extend closely about the opposite side walls and adjacent ends of the front walls of the body, one end edge of each flange being welded to one hub and the other end edge thereof being welded to the other hub, whereby each said flange functions as an eccentrically loaded tension member, and a conduit connected to and extending outwardly from the outer end of each hub to enable the valve to be connected in a line, each conduit being thinner than the hub to which it is connected.

2. A gate valve of the character defined in claim 1, wherein there are at least a pair of flanges on each side of the body.

3. A gate valve of the character defined in claim 2, wherein the flanges of each pair are on opposite sides of a plane passing through the axis of the flowway.

4. A gate valve of the character defined in claim 1, wherein the flanges are disposed within a plane passing through the axis of the flowway.

5. A gate valve of the character defined in claim 1, wherein the outer ends of the hubs have threaded holes which receive studs connecting the conduits to the hubs.

6. A gate valve of the character defined in claim 1, wherein the conduits are welded to the outer ends of the hubs.

* * * * *